United States Patent
Goldick

(10) Patent No.: US 7,159,056 B2
(45) Date of Patent: *Jan. 2, 2007

(54) METHOD AND SYSTEM FOR LOCKING MULTIPLE RESOURCES IN A DISTRIBUTED ENVIRONMENT

(75) Inventor: Jonathan S. Goldick, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 55 days.

This patent is subject to a terminal disclaimer.

(21) Appl. No.: 10/856,266

(22) Filed: May 27, 2004

(65) Prior Publication Data

US 2004/0221079 A1    Nov. 4, 2004

Related U.S. Application Data

(63) Continuation of application No. 09/992,168, filed on Nov. 13, 2001, now Pat. No. 6,748,470.

(51) Int. Cl.
*G06F 12/00*    (2006.01)

(52) U.S. Cl. ............... 710/200; 710/220; 710/240

(58) Field of Classification Search ............... 710/200, 710/220, 240–244, 260–261
See application file for complete search history.

(56) References Cited

U.S. PATENT DOCUMENTS

| | | | |
|---|---|---|---|
| 5,117,352 A | 5/1992 | Falek | 714/4 |
| 5,161,227 A | 11/1992 | Dias et al. | 709/104 |
| 5,303,368 A | 4/1994 | Kotaki | 707/8 |
| 5,367,671 A | 11/1994 | Feigenbaum et al. | |
| 5,485,607 A | 1/1996 | Lomet et al. | 707/8 |
| 5,502,840 A | 3/1996 | Barton | 710/200 |
| 5,549,862 A | 8/1996 | Vail | 707/8 |
| 5,745,747 A | 4/1998 | Chang et al. | 707/8 |
| 5,832,484 A * | 11/1998 | Sankaran et al. | 707/8 |
| 6,026,401 A | 2/2000 | Brealey et al. | 707/8 |
| 6,412,034 B1 * | 6/2002 | Chan | 710/200 |
| 6,510,478 B1 | 1/2003 | Jeffords et al. | 710/200 |
| 6,529,905 B1 | 3/2003 | Corsberg et al. | 707/8 |
| 6,625,698 B1 | 9/2003 | Vartti | 711/141 |
| 6,629,127 B1 | 9/2003 | Deen et al. | 710/200 |
| 6,748,470 B1 * | 6/2004 | Goldick | 710/200 |

FOREIGN PATENT DOCUMENTS

| | | |
|---|---|---|
| EP | 0 738 982 A2 | 10/1996 |
| EP | 0 738 982 A3 | 10/1996 |
| EP | 0 986 009 A2 | 3/2000 |
| EP | 0 986 009 A3 | 3/2000 |
| WO | WO 01/37081 | 5/2001 |

OTHER PUBLICATIONS

"HTTP Extensions for Distributed Authority—WEBDAV" by Y. Goland; E. Whitehead, UC Irvine; A. Faizi, Netscape; S. Carter, Novell; and D. Jensen, Novell, Feb. 1999, Network Working Group, Request for Comments: 2518, Standards Track.

(Continued)

*Primary Examiner*—Tim Vo
(74) *Attorney, Agent, or Firm*—Merchant & Gould

(57) ABSTRACT

A method and system that creates and maintains lock properties for a resource or object in a distributed environment. The method and system creates and/or updates lock objects to relate to multiple locks, i.e., multiple resources. The method and system creates and maintains lock properties for a resource or object in a distributed environment.

14 Claims, 7 Drawing Sheets

OTHER PUBLICATIONS

EP Search Report for EP 01 13 0444.
M. Norton, "OX/2s Extended Attributes", Technical Support, Online!, Jul. 1996; http://www.naspa.com/PDF/96/T9607014,pdf; 2 pages.

Russinovich, M., "Inside On-Access Virus Scanners", Windwos & .Net Magazine Network, Sep. 1997, 3 pages.
Patent Abstracts of Japan, vol. 007, no. 138. Jun. 16, 1983 & JP 58 052740 A; Fujitsu Ltd.; Mar. 29, 1983.

* cited by examiner

METHOD AND SYSTEM FOR LOCKING MULTIPLE RESOURCES IN A DISTRIBUTED ENVIRONMENT

This application is a continuation of Ser. No. 09/992,168 filed Nov. 13, 2001, now U.S. Pat. No. 6,748,470.

TECHNICAL FIELD

This invention relates generally to distributed computing environments and particularly to availability management of resources in a distributed environment. More particularly, the present invention relates to methods of "locking" distributed environment resources to prevent inappropriate access to such resources. More particularly still, the present invention relates to server-side management of locks within the WebDAV protocol.

BACKGROUND OF THE INVENTION

Distributed computer environments, such as computer networks, provide significant advantages to multiple computer clients or users. In particular, distributed environments allow multiple clients to actually share many different computer resources including both hardware and software resources. Sharing software-related resources provides many known benefits, such as the fact that only one such resource needs to be created, updated and maintained.

The Internet is one particular example of a distributed environment that provides access to a considerable number of software resources, which are available to practically any client computer system having Internet capabilities. One portion of the Internet is known as the World Wide Web which is a generally a system of Internet servers that house software related resources that are formatted in a particular manner, such as with HTML (HyperText Markup Language). The protocol for accessing these particular resources is known as the HyperText Transfer Protocol or HTTP. It should be noted however that not all Internet servers are part of the World Wide Web.

With recent advances, clients may effectively author resources on a server system from client systems over distributed networks, including the Internet. For instance, the WebDAV protocol or standard, which stands for the World Wide Web Distributed Authoring and Versioning standard, referred to herein as simply "DAV," provides a set of headers and methods which extend HTTP to provide capabilities for managing properties, namespace and other items from a client system in order to allow client computer systems to access server-side resources for the purpose of editing those resources. Proposed Standard RFC 2518, which is a document written by the IETF and approved by the IESG, published February 1999, describes DAV in more detail.

As part of the DAV standard, server computer systems provide various services in managing the various access requests made by clients. One particular service relates to controlling when a resource is available for use by a client. That is, DAV provides methods that allow a client to lock a resource when using that resource so that subsequent users may not access that resource during that time. This locking scheme helps prevent the "lost update" problem associated with two or more users modifying a resource simultaneously such that editions are inadvertently lost. Additionally, the locking scheme provides an ability to lock two resources that may be needed to perform a file-management type function. For example, assuming a resource exists in one folder, yet the owner wants to move the resource into another folder, i.e., the destination folder. In such a case the client needs to lock both the resource and the destination folder. Locking both resources allows for the operation to proceed without conflicts.

Although the locks are helpful in preventing the lost update problem, the present locking system implemented in DAV is unsatisfactory with respect to the allocation of these locks. For instance, a DAV lock only covers, at most, one resource tree. That is, the lock request itself typically includes a uniform resource identifier ("URI") and a depth. The depth indicates the number of levels of sub-elements or children of the resource identified by the URI to be locked. Unfortunately, if the client system needs to lock multiple URIs that are not in a parent child relationship, multiple lock requests are required. In return, the client system receives multiple lock tokens or cookies representing the locks on the various resources. Since many operations typically involve several different and unrelated resources, the request, receipt and management of the multiple locks increases the overhead involved.

Moreover, requesting multiple locks is not a satisfactory solution since some locks may be granted while others are not which negatively affects the atomicity of a requested operation. An atomic operation or the atomicity of an operation, relates to an operation that must be performed entirely or not at all. Since lock requests are typically associated with a particular access or command request, atomicity is typically required. Therefore, the partial granting of a selective few of the locks is not acceptable.

Additionally, if two or more separate client processes attempt to lock the same resources, a potential deadlock situation may occur, where each locks one of the resources but prevents the other(s) from locking all the resources. A deadlock situation precludes lock success for each of the processes. One solution to this problem involves a server-side utility that monitors lock requests and attempts to "remember" whether a lock request has been granted to a client process that is now requesting a subsequent resource. Recognizing that a client process is requesting a subsequent resource provides the server the ability to anticipate potential deadlock situations before they occur. Unfortunately, a significant amount of overhead is required to store information related to all previously granted lock requests, and the client that requested the lock.

It is with respect to these and other considerations that the present invention has been made.

SUMMARY OF THE INVENTION

The present invention solves these problems by creating and enabling the use of a new lock type request relating to multiple locks, i.e., multiple resources. The method and system creates and maintains lock properties for a resource or object in a distributed environment.

In accordance with certain aspects, the invention relates to a system and method of locking resources that receives a request to access more than one resource, wherein the request originates from a requesting client computer system and based on this request locks the requested resources. Upon locking the resources, the system and method provides a lock token related to the created lock to the requesting client computer system. The system and method may either create a new lock object for the resources or update and existing lock object. Thus, a plurality of resources may be locked based on one request. Additionally, since one request included an indication that more than one resource is to be locked, the receiving system can anticipate and resolve potential deadlock situations.

In accordance with other aspects, the system and method determining whether the resources are locked by one or more other client computer systems and locks the resources only if no existing lock conflicts with the type of access requested or the type of lock requested. When an existing lock is to be modified, the system and method may also determine whether the resources are locked by one or more other client computer systems or whether the requesting application is the lock owner and update a lock only if no existing lock conflicts with the type of access requested or the type of lock requested and if the requesting application is the owner. Further, prior to creating or updating the lock, a determination may be made as whether the other resources should be locked; and if other resources should be locked; then the system and method locks those resources.

In accordance with still other aspects, the present invention relates to a lock management system that has a receive module for receiving a request to lock a plurality of resources; a locking module for locking the requested resources; and an allocation module for allocating a lock token related to the requested resource. The lock management system may create or update a lock object that locks the plurality of resources. The lock object itself is a data structure having a resource list that identifies the resources locked by the lock object. The resource list may have universal resource identifiers (URIs) for each of the resources locked by the lock object.

The present invention also relates to a system and method for locking a resource that receives a request to access a particular resource, wherein the request originates from a requesting client computer system and then determines whether the resource is locked. Upon determining that the resource is locked, the system and method further determines whether an additional lock object may be associated with the resource and if so, creates another lock object and provides a lock token related to the created lock to the requesting client computer system. Additionally, the system and method allows for requesting application programs to request that only a predetermined number of additional lock objects be associated with the resource.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, to the following detail description of presently preferred embodiments of the invention, and to the appended claims.

DETAILED DESCRIPTION OF THE INVENTION

Figure 1:
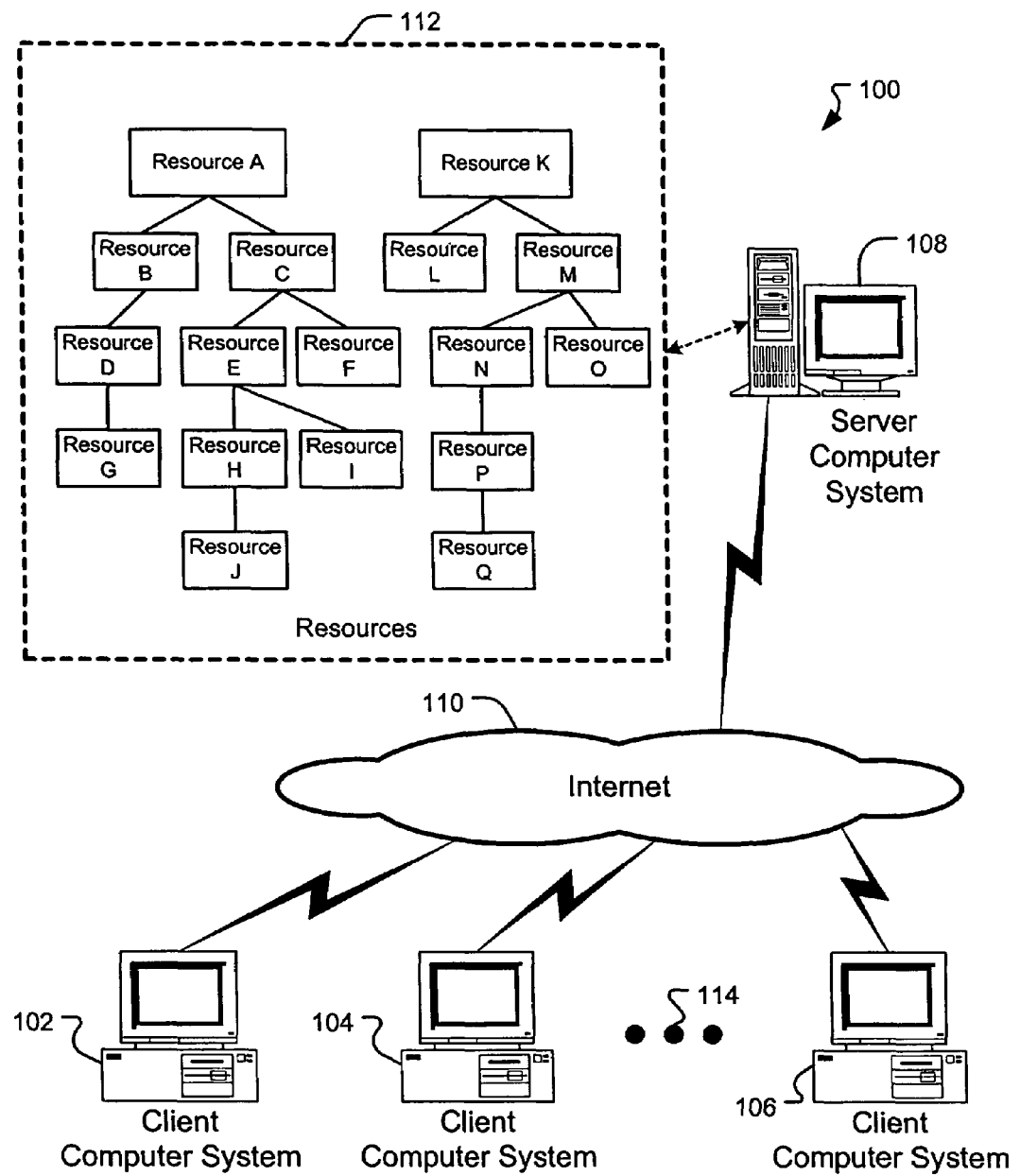
FIG. 1 is a diagram of a distributed environment having a client computer system and a server computer system that communicate according to principles of the present invention.

A distributed environment 100 incorporating aspects of the present invention is shown in FIG. 1. The environment 100 has at least one client computer system, such as client computer systems 102, 104 and 106 that interact with at least one server computer system, such as server computer system 108 over a distributed network, such as the Internet 110. The client computer systems 102, 104 and 106 request access to one or more server computer resources 112. Additionally, there may be other client computer systems as indicated by ellipses 114. In accordance with an embodiment of the present invention, the client computer systems 102, 104 and 106 may request that a singular lock be used to lock a plurality of otherwise unrelated resources 112. Additionally, the server computer system may provide the service of allowing only a predetermined number of client computer systems, such as systems 102, 104 and 16 access a particular number of resources at one time.

The resources 112 relate to computer readable files or objects, such as text documents, application program modules, data objects, properties or attributes for data objects, containers, among others. The resources may be HTML, XML, SGML files, or in other embodiments, the resources may be in another format. The resources 112 are described in terms as Resources A-Q and are shown as associated in a hierarchical manner, wherein Resources B-J are children, either direct or indirect, of parent Resource A. Similarly, Resources L-Q are children, either direct or indirect, of parent Resource K. As shown in FIG. 1, the hierarchical trees represented by parent Resource A and parent Resource K are not related to each other.

The resources 112 shown in FIG. I may be accessible through computer system 108. However, an embodiment of the present invention may apply to locking of various resources associated with other server computer systems as well. Indeed, those skilled in the art may appreciate that the locking schemes of the present invention may apply to the locking of many and varied resources accessible through many different means.

In an embodiment of the invention, the protocol used by the systems 102, 104, 106 and 108 to communicate is the WebDAV (World Wide Web Distributed Authoring and Versioning, hereinafter "DAV") protocol. DAV is an extension of the Hypertext Transfer Protocol version 1.1 (HTTP) and provides the methods and formats for allowing client computer systems, such as computer systems 102, 104 and 106 to access and edit computer resources 112. As stated in the Background Section above, DAV also provides a set of headers and methods, which extend the HTTP to provide capabilities for property and namespace management, among other features as discussed in Proposed Standard RFC 2518.

As one client computer system, such as system 102, accesses one of the resources 112, that resource may be locked such that the other client computer systems, such as systems 104 and 106 are unable to access the resource. Further, the computer system 102 may access multiple resources, such as resources F and N, with a single lock request.

Figure 2:
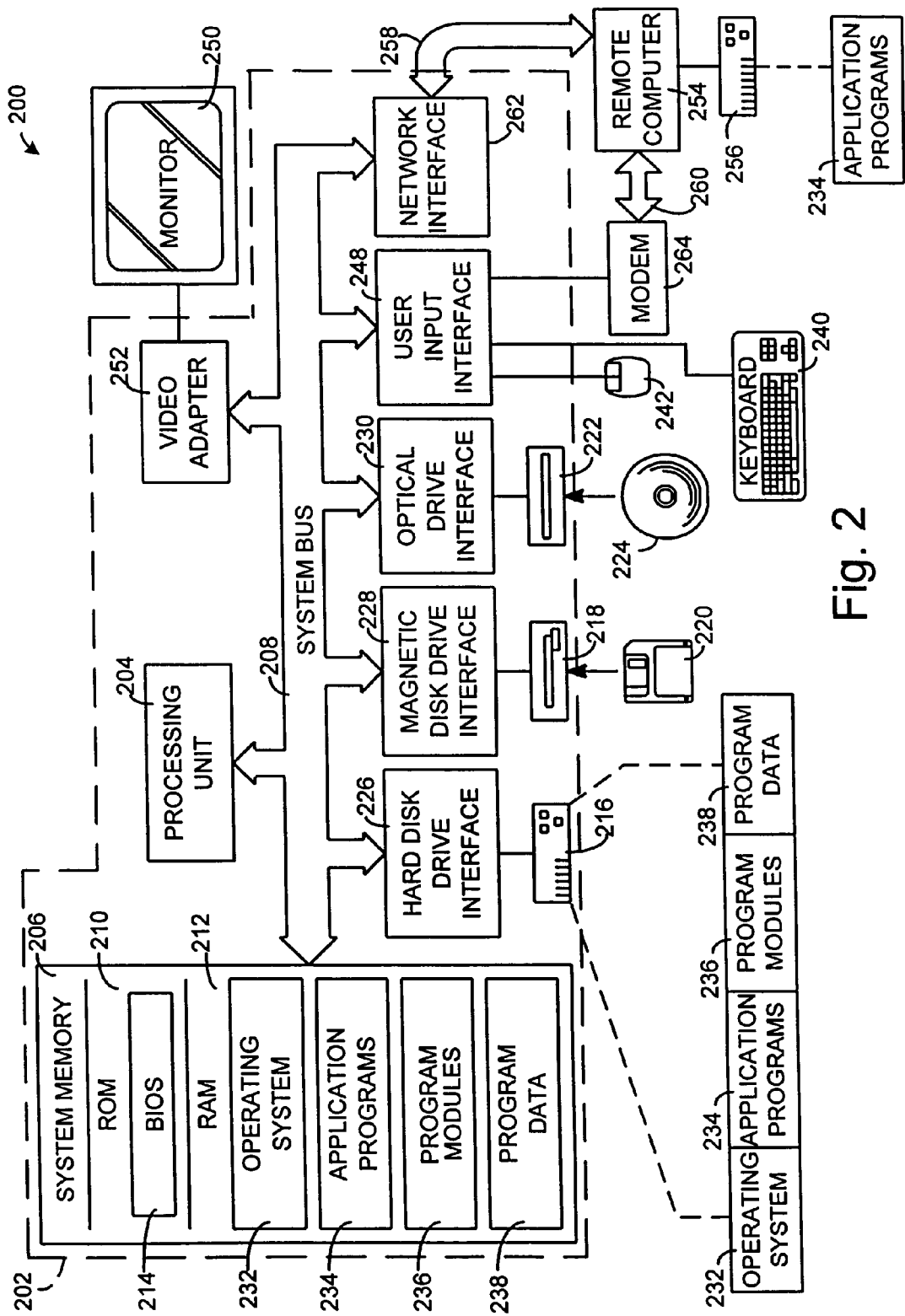
FIG. 2 is a functional diagram of a computer system that may incorporate aspects of the present invention.

FIG. 2 illustrates an example of a suitable computing system environment 200 in which aspects of the present invention may be implemented as either a client computer system such as systems 102, 104 or 106 or server computer system 108. The computing system environment 200 is only one example of a suitable computing environment and is not intended to suggest any limitation as to the scope of use or functionality of the invention. Neither should the computing environment 200 be interpreted as having any dependency or requirement relating to any one or combination of components illustrated in the exemplary operating environment 200.

Environment 200 incorporates a general-purpose computing device in the form of a computer 202. Components of computer 202 may include, but are not limited to, a processing unit 204, a system memory 206, and a system bus 208 that couples various system components including the system memory to the processing unit 204. The system bus 208 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architectures (MCA) bus, Enhanced ISA (EISA) bus, Video Electronics Standards Association (VESA) local bus, and Peripheral Component Interconnect (PCI) bus also known as Mezzanine bus.

Computer 202 typically includes a variety of computer readable media. Computer readable media can be any available media that can be accessed by computer 202 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDE-ROM, digital versatile disks (DVD) or other optical disk storage, magnetic cassettes, magnetic tape, magnetic disk storage or other magnetic storage devices, or any other medium which can be used to store the desired information and which can be accessed by computer 202. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 206 includes computer storage media in the form of volatile and/or nonvolatile memory such as read only memory (ROM) 210 and random access memory (RAM) 212. A basic input/output system 214 (BIOS), containing the basic routines that help to transfer information between elements within computer 202, such as during start-up, is typically stored in ROM 210, while RAM 212 typically contains files and/or program modules that are immediately accessible to and/or presently being operated on by processing unit 204. By way of example, and not limitation, FIG. 2 illustrates operating system 232, application programs 234, other program modules 236, and program data 238. Additionally, the computer 202 comprises a file system, which defines the format for the files of system 202, and further defines version-specific property formats, as discussed below.

The computer 202 may also include other removable/non-removable, volatile/nonvolatile computer storage media. By way of example only, FIG. 2 illustrates a hard disk drive 216 that reads from or writes to non-removable, nonvolatile magnetic media, a magnetic disk drive 218 that reads from or writes to a removable, nonvolatile magnetic disk 220, and an optical disk drive 222 that reads from or writes to a removable, nonvolatile optical disk 224 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 216 is typically connected to the system bus 208 through a non-removable memory interface such as interface 226, and magnetic disk drive 218 and optical disk drive 222 are typically connected to the system bus 208 by a memory interfaces, such as interfaces 228 and 230, respectively.

The drives and their associated computer storage media discussed above and illustrated in FIG. 2, provide storage of computer readable instructions, data structures, program modules and other data for the computer 202. In FIG. 2, for example, hard disk drive 216 is illustrated as storing operating system 232, application programs 234, other program modules 236, and program data 238.

A user may enter commands and information into the computer 202 through input devices such as a keyboard 240 and pointing device 242, commonly referred to as a mouse, trackball or touch pad. Other input devices (not shown) may include a microphone, joystick, game pad, satellite dish, scanner, or the like. These and other input devices are often connected to the processing unit 204 through an input interface 248 that is coupled to the system bus 208. A monitor 250 or other type of display device may also be connected to the system bus 208 via video adapter 252. In addition to the monitor, computers may also include other peripheral output devices such as speakers and printer not shown.

The computer 202 may operate in a networked environment using logical connections to one or more remote computers, such as a remote computer 254. The remote computer 254 may be a personal computer, a server, a router, a network PC, a peer device or other common network node, and typically includes many or all of the elements described above relative to the computer 202.

When used in a LAN networking environment, the computer 202 is connected to the LAN through a network interface or adapter 262. When used in a WAN networking environment, the computer 202 typically includes a modem 264 or other means for establishing communications over the WAN, such as the Internet. The modem 264, which may be internal or external, may be connected to the system bus 208 via the user input interface 248, or other appropriate mechanism. In a networked environment, program modules depicted relative to the computer 202, or portions thereof, may be stored in the remote memory storage device. It will be appreciated that the network connections shown are exemplary and other means of establishing a communications link between the computers may be used.

In addition to the environment 200 shown in FIG. 2, the invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Moreover, the present invention may be described in the general context of a software operating environment, e.g., computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 3:
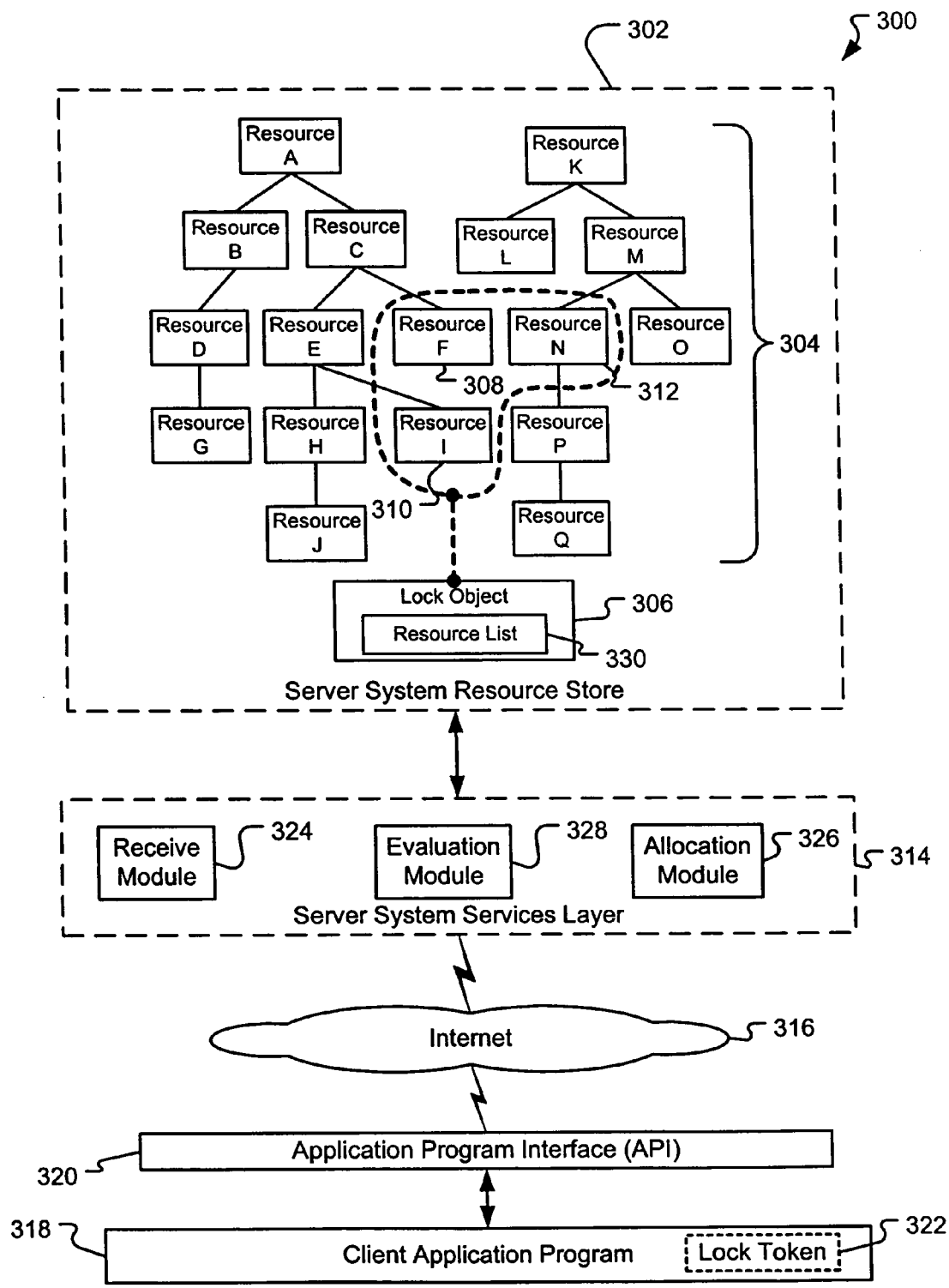
FIG. 3 is a block diagram illustrating software components of the present invention.

FIG. 3 illustrates an example of a software operating environment 300 in which the invention may be implemented. The software operating environment 300 is only one example of a suitable operating environment and is not intended to suggest any limitation as to the scope of use or functionality of the invention. Software environment 300 incorporates a Server System Resource Store 302, which defines the format and structure of various resources or objects, such as resources A-Q, collectively shown as resources 304. Typically, the Server System Resource Store 302 also provides the overall structure in which objects are named, stored and organized. Additionally, the store provides the protocols for accessing any resource within the store 302. In an embodiment, Store 302 is an XML store and has resources defined by the XML standard. However, it is contemplated that other resource configurations or collections may incorporate the aspects of the present invention. Resources, such as resources 304 within the store 302 may be data objects that represent actual file-type data or other resources such as containers or server-side processes. Additionally, the resources 304 may be accessed and/or modified by a user or another program module. Of course, the Store 302 may comprise many other resources that are not shown in FIG. 3.

Typically, each resource 304 has some form of meta information object (not shown) that is associated with each object, the meta information comprises information such as the author of the object, the time the object was last accessed, among others. This meta information may be stored as part of the data object or as part of another object having a pointer or some other identifying element that associates the meta information object with its particular data object.

In addition to the meta information objects, a resource may also be associated with a lock object, such as object 306. In an example of the invention, lock object 306 is associated with multiple resources, such as resources 308, 310 and 312. In general, lock objects, such as object 306, comprise information related to its associated resources and the scope and type of lock applied to its resources. As discussed in more detail below, the lock object 306 relates to a plurality of resources of separate hierarchical trees. Moreover, the lock 306 does not necessarily lock all children of a locked resource.

Environment 300 also has a services layer 314, which relates to server functionality in servicing access requests for resources 304. The services layer 314 may provide various functions, such as ensuring that an object access request complies with the existing protocol; whether the request relates to either an existing object or, in DAV, to an object that is to be created; whether the module making the request has permission to make and perform the request; among others. The services layer 314 also manages the availability of resources based on lock analysis as discussed in more detail below.

The services layer 314 receives requests over a distributed network environment, such as Internet 316. The requests are made by client computer applications, such as application 318. In one embodiment, application program 318 is a client application program that operates on a client system apart from a server system, wherein the server system is the physical location of the Store 302. In other embodiments however, the application program, i.e., program 318 may actually be part of the server system. Application 318 interacts with the distributed network environment 316 through application program interface 320. The access requests may involve requests to move, copy, delete, read, execute or update a resource or object, such as resources 304.

With respect to the lock object 306, in an embodiment of the invention, application program 318 causes the creation of lock object 306 related to resources 308, 310 and 312. Alternatively, the services layer 314 may create the lock object, and associate the lock object with the resources. Once a lock object, e.g., lock object 306, has been created, another application may determine the existence of such a lock object and access the locked data object only in accordance with parameters set by the lock object, if at all.

In an embodiment of the invention, the services layer 314 actually performs the creation and management of the lock object 306. As described in more detail below, the services layer 314 receives a request from a client application program, such as application 318. The services layer then processes the request, i.e., determines whether the client application may access the data object in the requested manner. If the application is able to access the data object in the requested manner, the services layer 314 returns a lock token 322 to the client application program 318 and allows the requested access. If the services layer 314 determines that the application program may not access the requested data object in the requested manner, such as to read, write, or delete the resource, access is denied.

To further this example, assume a second application program (not shown) attempts to access a data object that is locked by client application 318, as evidenced by the lock token 322. In such a case, other applications or processes (not shown) cannot access that data object until client application 318 frees the lock token 322. However, as discussed in more detail below, depending on the type of lock created by client application 318, other client application programs may still be able to access the locked data object to perform predetermined operations, such as to only read the data object, or to only delete the data object, etc. The types of locks provided by the services layer, and used by the client application programs are discussed in more detail in the U.S. patent application Ser. No. 09/992,644, entitled METHOD AND SYSTEM FOR LOCKING RESOURCES IN A DISTRIBUTED ENVIRONMENT which was filed on Nov. 13, 2001 and assigned to the Assignee of the present application, and which is incorporated herein by reference for all that it discloses and teaches.

The lock object 306 further includes a resource list 330. The resource list comprises information related to each of the resources that are locked, such as resources 308, 310 and 312 shown in FIG. 3. The type of identifying information may vary, but provides enough information to uniquely identify the various locked resources. In one embodiment the identifying information is the URI for each resource, and thus the resource list may be referred to as a URI list. The resource list 330 is maintained by the lock object 306, but in alternative embodiments, the resource list 330 may be maintained elsewhere, such as by the services layer 314. The resource list 330 is used by the lock object and the services layer to ascertain which resources are locked and to which type of lock is applied.

The services layer 314, in an embodiment, has several modules to perform the various functions of the present invention. The layer 314, for example may have a receive module that receives requests for resources from client application programs such as program 318. The receive module performs the necessary communication functions to adequately receive and possibly acknowledge the receipt of the request via the Internet 316 or any other distributed network system. Additionally, once a lock request has been allowed, the layer 314 may further employ an allocation module 326 used in communicating with the application program and in particular, used in allocating a lock token to the requesting client application program 316. The allocation module 326 may simply send the lock token information to the client application, such as program 318 or may be more extensive in its communication with the client application program.

In a particular embodiment, the layer 314 further includes an evaluation module 328 that is used to determine whether requested resources may be accessed and/or locked according to the request. The evaluation module further provides the ability to lock resources according specific resource identifiers, i.e., identification elements uniquely associated with each individual resource. This process allows specific resources or portions of a hierarchical resource association, such as the tree structure shown in FIG. 3, to be locked while not necessarily locking the children of that resource.

Evaluation module 328 may further determine whether other resources must be locked in order to perform the requested access. That is, in some cases the requested access may require the locking of various resources, whether explicitly requested or not. In such a case, the evaluation module 328 may provide the services of recognizing that other resources should be locked based on the request and determining whether those additional resources can be locked. Once evaluation module 328 determines that the resources can be locked, a lock object is created and allocation module 326 allocates a lock token.

In a particular embodiment, the evaluation module 328 extends the HTTP, as part of DAV introducing a new bulk lock method, referred to herein as "B-LOCK", to support the acquisition of a lock that spans disparate URI(s). As part of a B-LOCK command, the client application program requests a list of resources or elements, e.g., "lockinfo elements" and associated depths for each of those resources. The list is a URI list indicating URI(s) for the resources. In DAV, since the LOCK method restricts the associated depths to either zero or infinity, the associated depths for B-LOCK may also be set at zero or infinity where zero only locks the one resource and infinity locks all children of the resource. Alternatively, other embodiments may allow other depth values.

In an implementation of B-LOCK, the request will only succeed if all listed resources in the associated URI list can be acquired. The same resource may appear in multiple lockinfo elements directly or though a depth Infinity, but the resource will not be locked recursively. The lock type values in the applicable lock information portions are combined to yield the effective lock type requested. A client may have to process all of the "activelock" information to determine what lock type(s) are held on a particular resource.

In an embodiment, the interactions between B-LOCK and other methods are the same as for the existing LOCK method. For instance, the return codes and responses may be similar to those of the LOCK method. If a URI is specified that is not below the Request-URI, a 502 (Bad Gateway) code is returned. If the server detects a deadlock while processing the request, another code is returned indicating such a situation. As with the LOCK method, the "lockdiscovery" information must be returned for each "href" specified in the lockinfo elements in the request body, although the information may be filtered due to security concerns. When there is a failure, it is only required that the returned Multi-Status response include entries that actually caused the request to fail.

The B-LOCK method contains a request body with at least one "bulklock element," which is defined below. The resources listed in the lockinfo elements must be URI(s) that are at or below the Request-URI.

In an embodiment, the definitions of the "lockinfo" and "activelock" XML elements are extended to support the functionality of the B-LOCK method. These elements now include the URI(s) covered by the lock. There may be no need to extend the lockentry XML element to indicate support for the B-LOCK functionality; that is, the support for the B-LOCK method may be placed in an OPTIONS request.

Accordingly, in order to define the new B-LOCK method in DAV the document type definitions (DTD) shown in Table 1 may be implemented. Of course these samples could also be written as schemas.

TABLE 1

Sample DTD Definitions For Implementing B-LOCK:

1 Name: lockinfo
  Namespace: DAV:
  Purpose: The lockinfo XML element is used with the LOCK, B-LOCK, and other methods to specify the type of lock the client wishes to have created.
  Description: This element specifies the type of lock to be created, as indicated by the client application program. If the lock only covers the Request-URI, the href element can be omitted. Otherwise, the href element should indicate the URI to be locked.

TABLE 1-continued

Sample DTD Definitions For Implementing B-LOCK:

```
<!ELEMENT lockinfo (lockscope, locktype, owner?,
lockenforcementrule?, href?)>
2 Name: activelock
  Namespace: DAV:
  Purpose: Describes a lock on a resource.
  Description: This element describes an active lock on a resource.
  If the lock only covers the Request-URI, the href element can
  be omitted. Otherwise, the href element should indicate the URI
  that is locked. <!ELEMENT activelock (lockscope, locktype,
  depth, owner?, timeout?, locktoken?, lockenforcementrule?,
  expectedlifetime?, href?)>
3 Name: bulklock
  Namespace: DAV:
  Purpose: Describes a list of locks to be acquired.
  Description: This XML element describes how a list of URI(s) is
  to be locked, with associated Depths.
  <!ELEMENT bulklock (depth, lockinfo)>
```

As shown in Table 1, a new method of locking is implemented, bulklock which describes a list of locks to be acquired. In order to implement the new lock method, the href property is used to provide multiple locking on specific URIs. These values will enable the locking of multiple URIs.

In order to create a bulk lock, a request is made that includes B-LOCK request information such that the lock request is coincident with an access request. Consequently, when a client system is requesting access to several resources, or requesting to create and use various resources, the client system includes a request for a lock on these resources. The server computer system determines whether to provide the lock requested. Once a lock type is granted, the server computer system enforces the lock type against other access requests.

Additionally, since one request included an indication that more than one resource is to be locked, the receiving system can anticipate and resolve potential deadlock situations. For instance, the services layer 314 may provide a check system to determine whether other processes desire to lock one or more of the resources provided in the URI list. If so, the services layer 314 may anticipate a potential deadlock situation and implement a rule-based approach to resolving the potential deadlock. Such a rule-based approach, in one embodiment, may require that each individual URI be locked in a certain order, wherein the order that would allow one client process to succeed in locking the multiple resources. Alternative embodiments may implement other methods of resolving the deadlock situation.

Table 2 illustrates an example request and two sample responses, one success case and one failure case. As shown in Table 2, the server computer system may accept or deny the requested access, and hence the request to create a lock spanning disparate URIs.

TABLE 2

Example Request and Responses:

| | |
|---|---|
| Request | BLOCK /container/HTTP/1.1<br>Host: webdav.microsoft.com<br>Timeout: Infinite, Second-4100000000<br>Maxwaittime: Second-60<br>Expectedlifetime: Second-3600<br>Content-Type: text/xml; charset="utf-8"<br>Content-Length: xxxx<br>Authorization: Digest username="jgoldick",<br>realm="jgoldick@webdav.microsoft.com", nonce="...",<br>uri="/container/",<br>response="...", opaque="..."<br><?xml version="1.0" encoding="utf-8" ?><br>  <D:bulklock xmlns:D='DAV:'><br>    <D:depth>0</D:depth><br>    <D:lockinfo><br>      <D:lockscope><D:exclusive/></D:lockscope><br>      <D:locktype><D:write/></D:locktype><br>      <D:lockenforcementrule><D:mandatory/><br>      </D:lockenforcementrule><br>      <D:href>file1</D:href><br>    </D:lockinfo><br>  </D:bulklock><br>  <D:bulklock xmlns:D='DAV:'><br>    <D:depth>Infinity</D:depth><br>    <D:lockinfo><br>      <D:lockscope><D:shared/></D:lockscope><br>      <D:locktype><D:nosharewrite/></D:locktype><br>      <D:lockenforcementrule><D:advisory/><br>      </D:lockenforcementrule><br>      <D:href>/container/dir2/dir3/file4</D:href><br>    </D:lockinfo><br>  </D:bulklock> |
| Response<br>Success Case | HTTP/1.1 200 OK<br>Content-Type: text/xml; charset="utf-8"<br>Content-Length: xxxx<br><?xml version="1.0" encoding="utf-8" ?><br>  <D:prop xmlns:D="DAV:"><br>    <D:lockdiscovery><br>      <D:activelock><br>        <D:lockscope><D:exclusive/></D:lockscope><br>        <D:locktype><D:write/></D:locktype> |

TABLE 2-continued

Example Request and Responses:

```
                <D:depth>0</D:depth>
                <D:owner>
                    <D:href>
                    http://www.microsoft.com/~jgoldick/contact.html
                    </D:href>
                </D:owner>
                <D:timeout>Second-604800</D:timeout>
                <D:locktoken>
                    <D:href>
                    opaquelocktoken:e71d4fae-4may-22d6-fea5-00a0c91e6be4
                    </D:href>
                </D:locktoken>
                <D:lockenforcementrule><D:mandatory/>
                </D:lockenforcementrule>
                <D:expectedlifetime>Second-3600</D:expectedlifetime>
                <D:href>file1</D:href>
            </D:activelock>
            <D:activelock>
                <D:lockscope><D:shared D:locklimit=Infinity></D:lockscope>
                <D:locktype><D:nosharewrite/></D:locktype>
                <D:depth>Infinity</D:depth>
                <D:owner>
                    <D:href>
                    http://www.microsoft.com/~jgoldick/contact.html
                    <D:href>
                </D:owner>
                <D:timeout>Second-604800</D:timeout>
                <D:locktoken>
                    <D:href>
                     opaquelocktoken:e71d4fae-4may-22d6-fea5-
            00a0c91e6be4
                    </D:href>
                </D:locktoken>
                <D:lockenforcementrule><D:advisory />
                </D:lockenforcementrule>
                <D:expectedlifetime>Second-3600</D:expectedlifetime>
                <D:href>/container/dir2/dir3/file4</D:href>
            </D:activelock>
        </D:lockdiscovery>
        </D:prop>
```

| | |
|---|---|
| Response Failure Case | HTTP/1.1 207 Multi-Status<br>Content-Type: text/xml; charset="utf-8"<br>Content-Length: xxxx<br>`<?xml version="1.0" encoding="utf-8" ?>`<br>`<D:multistatus xmlns:D="DAV:">`<br>  `<D:response>`<br>   `<D:href>http://webdav.microsoft.com/container/dir2/dir3/file4/secret`<br>   `</D:href>`<br>   `<D:status>HTTP/1.1 403 Forbidden</D:status>`<br>  `</D:response>`<br>  `<D:response>`<br>   `<D:href>http://webdav.microsoft.com/container/dir2/dir3/file4`<br>   `</D:href>`<br>   `<D:propstat>`<br>    `<D:prop><D:lockdiscovery/></D:prop>`<br>    `<D:status>HTTP/1.1 424 Failed Dependency</D:status>`<br>   `</D:propstat>`<br>  `</D:response>`<br>`</D:multistatus>` |

With respect to the success case example shown in Table 2, the request acquires an exclusive, mandatory write lock on "file1" and a shared, advisory, nosharewrite lock on the resources at and below "file4." In this example, the "nonce," response, and opaque fields have not been calculated in the authorization request header. In this case, the opaquelocktoken, timeout, and expectedlifetime are the same for both sets of resources as they are part of the same lock. The locklimit element in the above example is defined below.

With respect to the failure case shown in Table 2, the error is a 403 (Forbidden) response on the resource http://webdav.microsoft.com/container/dir2/dir3/file4 secret.

Because this resource could not be locked, none of the resources are locked. In this case, the lockdiscovery property for file4 is returned as required and no information is returned on "file1." This indicates that the failure had nothing to do with that resource.

It should be further noted that URIs may be added to a lock in future UPDATELOCK requests. The second update lock method is further defined in U.S. patent application Ser. No. 09/992,525, entitled METHOD AND SYSTEM FOR MODIFYING LOCK PROPERTIES IN A DISTRIBUTED ENVIRONMENT which was filed on Nov. 13, 2001 and assigned to the Assignee of the present application, and which is incorporated herein by reference for all that it discloses and teaches. Its application to this particular invention is described in more detail below with respect to FIG. 5.

Figure 4:
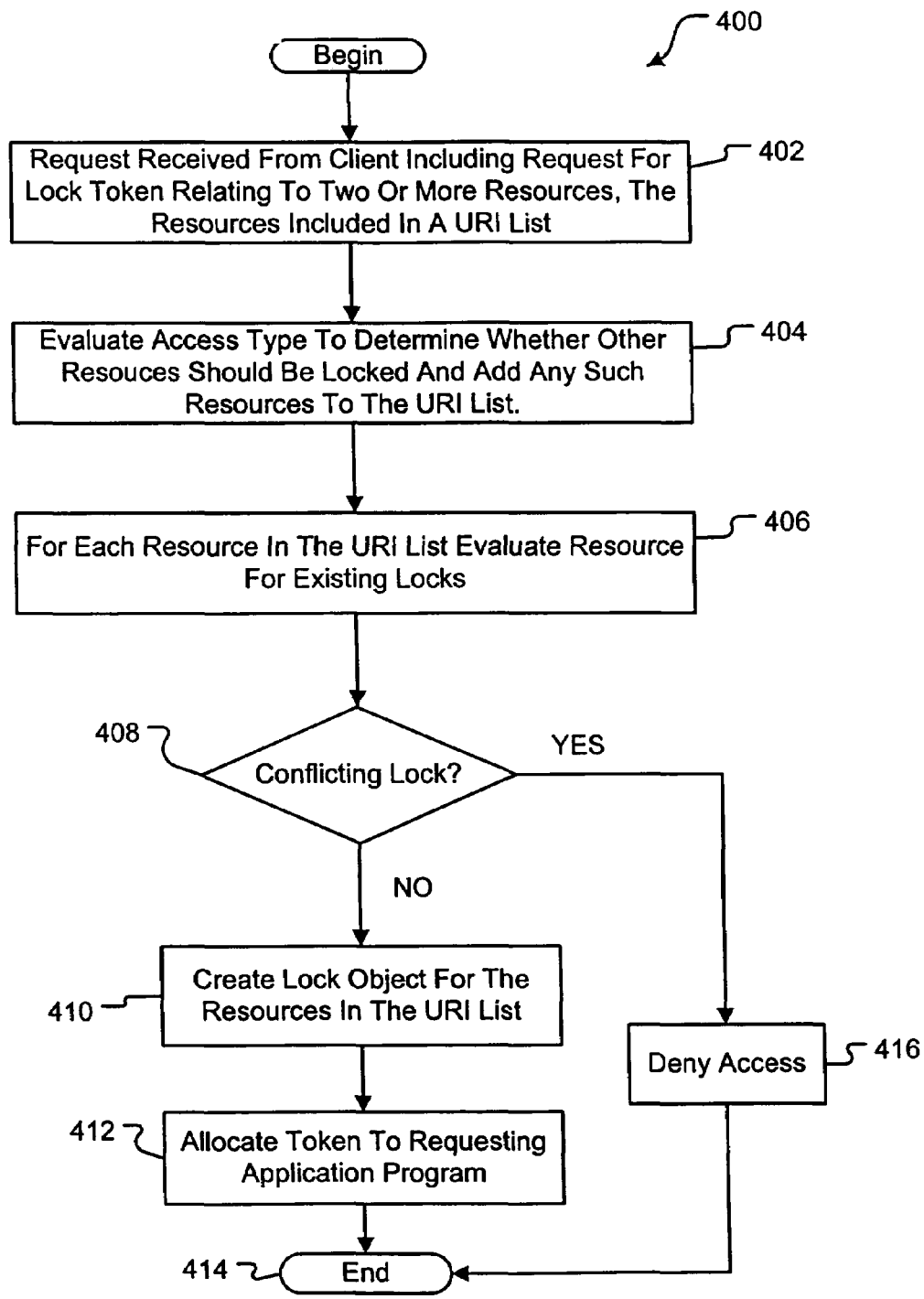
FIG. 4 is a flow diagram illustrating the functional components of locking multiple resources according to the present invention.

FIG. 4 is a flowchart of operational characteristics relating to accessing and locking resources according to aspects of the present invention. Prior to the beginning of flow 400, resources, such as resources 304 shown in FIG. 3, may already exist within a resource store such as store 302. In such an embodiment once the resources have been created then any later attempt to access that resource may initiate the flow 400 shown and described in conjunction with FIG. 4. In alternative embodiments, however, e.g., such as when the DAV protocol is used, all resources may not exist prior to flow 400. In such a case a lock object may be created in parallel with the creation of one or more resources or other data objects. Alternatively, the lock object may be created and later associated with a data object once the data object is created.

Process 400 generally begins with receive operation 402, wherein the receive operation relates to the receipt, by the server system of any read execution or update access request related to an object. In this embodiment the access request incorporates information related to the type of access that is being requested, i.e., to read, to write, to delete, etc. Additionally the request information further includes information as to what resource is to be locked. In other embodiments the request may include other information as well. In particular, the access request includes a URI list of resources that are to be locked.

Following the receipt of the request from the client application program, evaluation operation 404 evaluates the access type indicated in the request. The access type relates to whether the resources are to be copied, moved, read, among others. Evaluation operation 404 evaluates the access type to determine whether other resources should be locked, i.e., resources that are not included in the supplied URI list. For example, if a resource listed in the URI list is to be moved to another container, then all children of that URI resource should also be moved and, therefore, should also be locked. Evaluation step 404 determines that these children resources should also be locked, especially when those children are not included in the initial URI list. During evaluation operation should any resource be locked that is not on the URI list, these resources are then added to the URI list.

Following evaluation operation 404, each URI resource listed in the URI list is evaluated for existing and conflicting locks. Once the URI list resources have been evaluated, determination operation 408 determines whether any of the locks are conflicting. If no conflicting locks exist, flow branches "NO" to create operation 410. Create operation 410 creates a lock object for the resources in the URI list. Following creation of the lock object for those resources, allocation operation 412 allocates a lock token to the requesting application program. The allocation process is similar to the allocation process in providing a lock token to the client application program for a single resource.

Referring back to determination operation 408, if a conflicting lock exists, flow branches "YES" to deny operation 416. Deny operation 416 denies access to the requested resources and does not create a lock for any of the resources. Importantly, if any one resource cannot be locked due to the existence of a conflict of any kind, then access is denied 416. In an embodiment of the invention an acknowledgement/communication is sent to the client communication program indicating that the requested access has been denied. Following deny access operation 416, flow branches to end operation 414.

Figure 5:
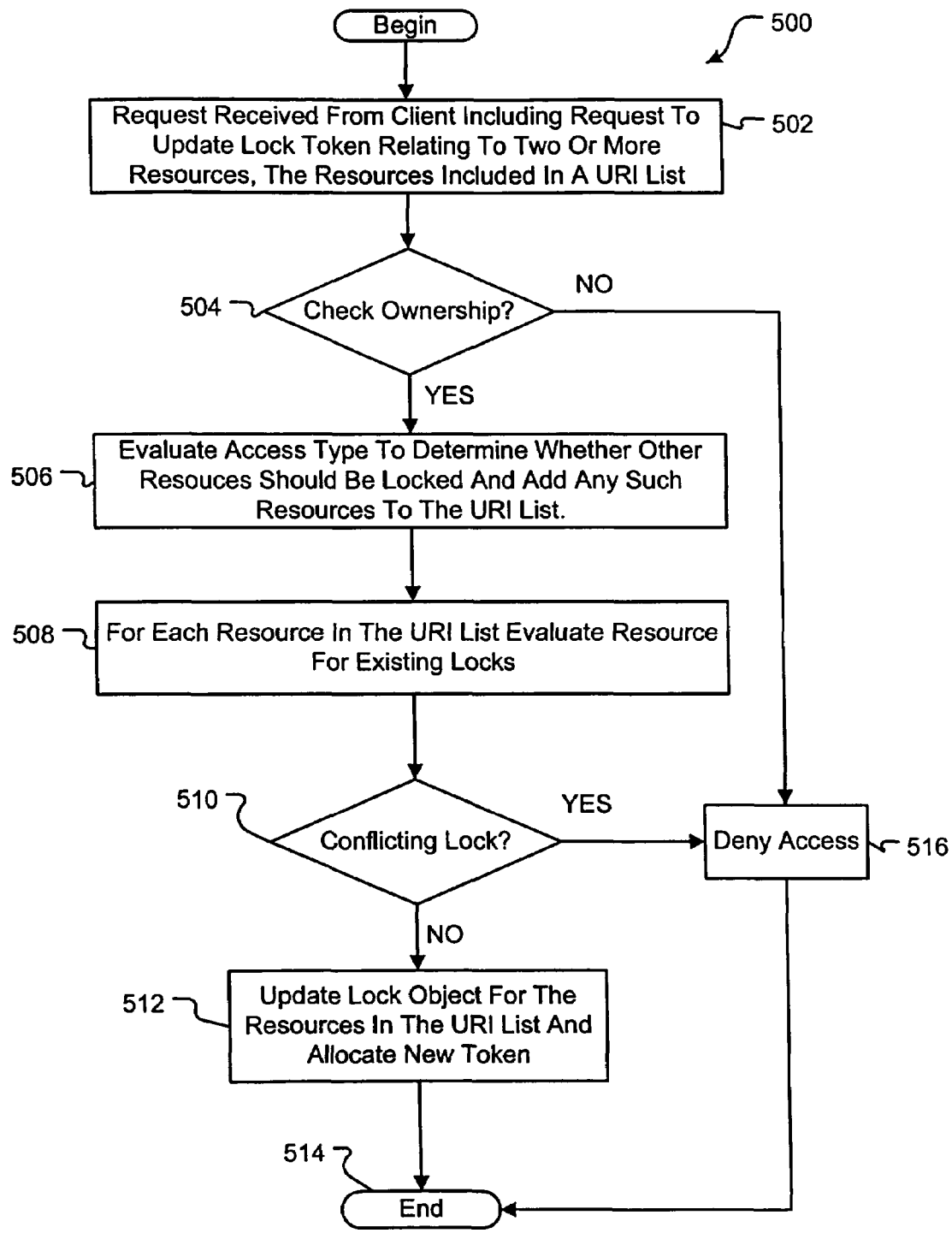
FIG. 5 is a flow diagram illustrating the functional components of updating a lock object related to multiple resources according to the present invention.

FIG. 5 is a flowchart illustrating operational characteristics in locking multiple resources in accordance with aspects of the present invention. In particular, flow 500 shown in FIG. 5 relates to a request for multiple resources to be locked wherein the request is made by an existing lock owner, and the lock request relates to updating the existing lock.

As described above, flow 500 begins with receive operation 502. Receive operation 502 receives a request from a client indicating that a lock token should be updated to include one or more new resources. Moreover, the update may include a URI list of one or more resources that should be included in the existing lock.

Following receive operation 502, check ownership operation 504 determines whether the request may be processed in accordance with ownership requirements. That is, the requested update operation must be made by the owner of the existing lock. Consequently, check operation 504 determines whether the existing lock owner is the same as the client application program making the request. If the person making the request owns the existing lock, flow branches "YES" to evaluate operation 506.

Evaluate operation 506 evaluates the request to determine whether other resources should be locked in addition to those indicated by the URI list. Typically since the update is to add new resources to a list then the access type has already been determined and no new resources should be added to the list. However, in some cases the addition of a new resource may require that the access type of the original lock be evaluated to determine if other resources should be included. Operation 506 performs this evaluation. Operation 506 is similar to operation 404 described above in combination with FIG. 4.

Following evaluation operation, check operation 508 checks the resources in the URI list for existing locks. For each of the locks that are found by operation 508, determination operation 510 determines whether those locks are conflicting. If no conflicting locks are found, flow branches "NO" to update lock object operation 512. Update lock operation 512 updates the lock object for the resources in the URI list and allocates a new lock object token to the client application program. Following update lock object operation 512, process 500 ends at end operation 514.

If check operation 510 determines that there are conflicting locks, flow branches "YES" to deny operation 516. Deny operation 516 denies the access to the requested resources. Deny operation 516 is similar to deny operation 414 described above in combination with FIG. 4. In an embodiment of the invention, a notification is sent to the client application program to inform the client application program that the access was denied. Importantly, if any one URI resource in the list has a conflicting lock, then access is denied at operation 516. Following deny access operation 516, flow 500 ends at end operation 515.

Figure 6:
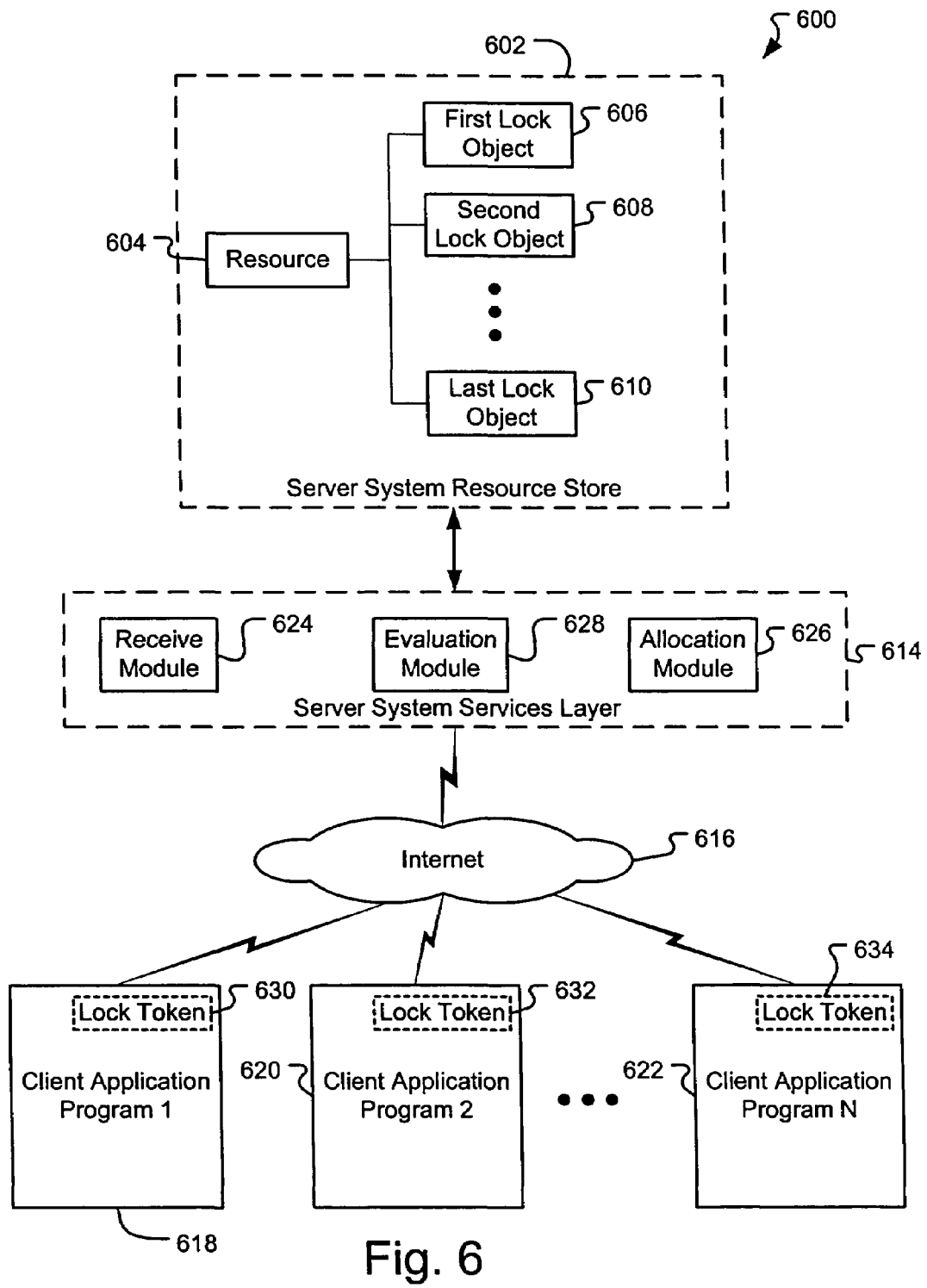
FIG. 6 is a block diagram illustrating software components of another embodiment of the present invention.

In another embodiment of the invention, as shown in FIG. 6, the software environment includes a server side resource store 602 that houses resources, such as resource 604. In this embodiment, there may be multiple lock objects, such as object 606, 606, and 610. The multiple lock objects 606, 608, and 610 may be associated with one particular resource 604. These lock objects are associated with resource 604 through the use of server side system layer 614.

The server side system layer 614 communicates via a distributed network, such as Internet 616, with a plurality of client application programs 618, 620, and 622. The client application programs 618, 620 and 622 communicate requests for access to a resource, such as resource 604.

The server system layer has a receive module for receiving requests from client application programs. The receive module is similar to the receive module described above with respect to FIG. 3. The receive module handles communication between the client application programs and the server system layer with respect to receiving requests. The server side system layer also has an allocation module 626 that allocates locks and lock tokens to the client application programs when locks are allowed.

Importantly, in this embodiment, the service layer further includes an evaluation module 628 that evaluates various requests attributes to determine whether a resource may be locked by more than one client application program, such as application program 618, 620 and 622. Furthermore, the evaluation module provides the task of counting the number of client application programs that have a lock on a particular resource, such as resource 604, and effectively limits the total number of client application programs that may have a lock on a particular resource at a particular time.

For instance, as shown in FIG. 6, the resource 604 is locked by a predetermined number N of lock objects such as a first lock object 606, a second lock object 608 up to and including an Nth lock object 610. Lock object N relates to a predetermined integer number of locks, which may be as small a number as two. The evaluation module 628 maintains the number of locks to the predetermined number N. Therefore, no more than N number of lock objects can be associated with one particular resource at one time in this embodiment.

In the embodiment shown in FIG. 6, each application 618, 620, and 622 has a lock token 630, 632, and 634, respectively, associated with the resource 604. In other embodiments separate processes, as opposed to applications, may each have a lock token, and hence, access to a particular resource. The process of limiting the number of lock objects in this embodiment is similar to the counted semaphore approach in win 32.

In an embodiment of the invention, a new "locklimit" feature is utilized, wherein the locklimit feature or attribute is an extension of the HTTP, as part of DAV. In essence, the locklimit attribute is a new type of DAV attribute. In order to define the new locklimit attribute in DAV the document type definition (DTD) shown in Table 3 may be implemented. Of course this sample could also be written as schema.

TABLE 3

Sample DTD Definition For Implementing locklimit:

1 Name: locklimit
  Namespace: DAV:
  Purpose: The locklimit XML attribute is used to limit the number of concurrent shared locks that can be acquired on a resource.
  Description: The locklimit XML attribute is used to limit the number of concurrent shared locks that can be acquired on a resource. The default value is Infinity. The value must be greater than 1, since a value of 1 is equivalent to an exclusive lock.
  <!ATTRLIST shared locklimit "Infinity">

Figure 7:
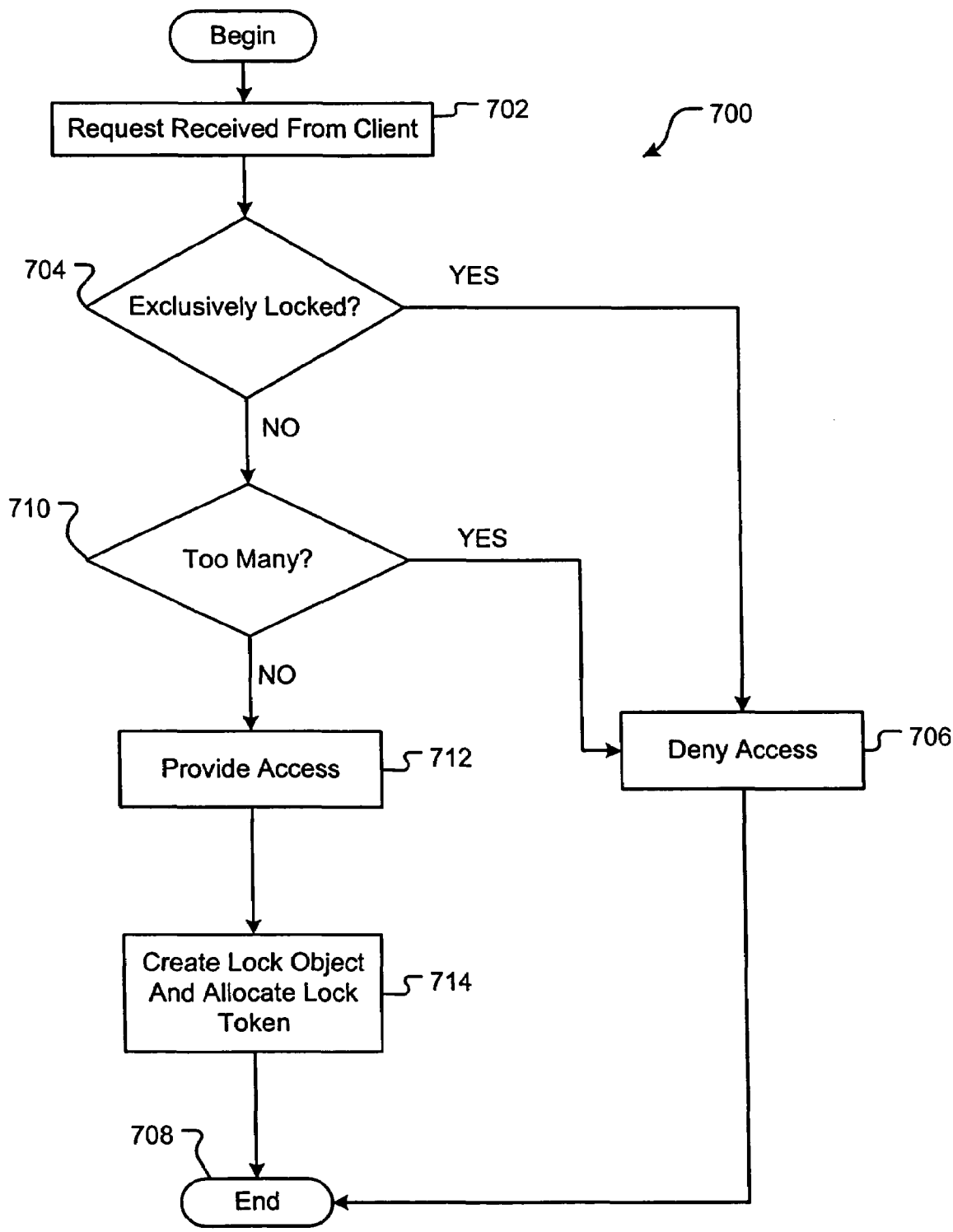
FIG. 7 is a block diagram illustrating software components of another embodiment of the present invention.

FIG. 7 is a flow of operational characteristics related to accessing a resource according to aspects of the invention related to counted sharable locks. As described above with respect to FIGS. 4 and 5, prior to the beginning of flow 700 a resource, such as resource 604 as shown in FIG. 6, exists within a server system resource store, such as store 602. In this particular embodiment of the invention once an object has been created, then any attempt to access that object may initiate the flow 700 as shown and described in conjunction with FIG. 7.

FIG. 7 flowchart 700 begins with receive operation 702 wherein the receive operation 702 relates to the receipt, by the server system, of any read execution or update access request for an object. The access attempt may be performed by a third party application, such as applications 618, 620, or 622 shown in FIG. 6.

Additionally, the access attempt may be made by the services layer 614 or by yet another client type requesting entity. The request itself may include information as to the type of access sought in any lock types to be created and enforced during the access, request for lock token, etc. Additionally, in this particular case, the request provides an indication that the lock is sharable.

Once the request has been received, determination act 704 determines whether the request is locked by another client application program, and if so, whether that lock provides exclusivity to the owner. Exclusivity to the owner would indicate that the lock could not be shared by another.

If test operation 704 determines that the resource is exclusively locked, then flow branches "YES" to deny operation 706. Deny operation 706 denies access to the resource and may provide a notification to the client application program as such. Following deny operation 706, flow branches to end operation 708 ending flow 700.

On the other hand, if test operation 704 determines that the resource is not exclusively locked, then flow branches "NO" to test operation 710. Test operation 710 determines whether or not the resource may be locked based on the number of existing lock objects for that resource. For instance, the test operation may count the number of existing locks, compare the number of existing locks to a predetermined threshold number, and based on the results of this comparison, determine that another lock object may be allowed. Alternatively, the test operation may use any other method of determining whether or not another test lock object can be created for that resource.

If test operation 710 determines that there are too many existing lock objects, i.e., there are a predetermined number of lock objects, flow branches "YES" to deny operation 706. Deny operation 706, as discussed above, denies access to the resource and may provide notification to the client application program as such. Following deny operation 706, flow 700 ends at end operation 708.

However, if test operation 710 determines that there are not too many existing lock objects, flow branches "NO" to provide access operation 712. Provide access operation 712 provides the client application program with access to the requested resource. Following provide access operation 712, create lock object operation 714 creates a lock object for the requesting client application program. Create operation may further allocate a lock token to the requesting client application program. Following create operation 714, flow ends at end operation 708.

The above described system and method provides a significant advantage over prior methods of managing resource locks in a distributed environment. In particular, the present invention provides the ability to lock multiple resources in a URI list using a single lock command request. The resources may or may not be children of the same parent object. Additionally, the ability to group multiple resources under a single lock, i.e., providing the server with a request to lock multiple resources at once makes deadlock detection at the server much easier, such that server does not have to "remember" locks that have failed to grant because of a lock conflict and determine if multiple clients are attempting to lock the same resources in the opposite order. Furthermore, an implementation of counted semaphores types advance the locking schemes and enables compatibility with existing, non-DAV related applications.

As discussed above, the invention described herein may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

Additionally, although the invention has been described in language specific to structural features and/or methodological steps, it is to be understood that the invention defined in the appended claims is not necessarily limited to the specific features or steps described. Therefore, the specific features and steps are disclosed as preferred forms of implementing the claimed invention.

What is claimed is:

1. A method of locking a resource in a distributed environment, the method comprising:
   receiving a request to access a particular resource, wherein the request originates from a requesting client computer system;
   determining whether the resource is locked;
   if the resource is locked, determining whether an additional lock object may be associated with the resource;
   if an additional lock object may be associated with the resource, creating another lock object; and
   providing a lock token related to the created lock to the requesting client computer system.

2. A method as defined in claim 1 wherein a lock request may request that only a predetermined number of additional lock objects be associated with the resource.

3. A method of locking resources in a distributed environment, the method comprising:
   receiving a request to access more than one resource, wherein the request originates from a requesting client computer system, and wherein the access request comprises a list of universal resource identifiers for at least two unrelated resources to be locked; as a result of a said reqeust,
   locking the requested resources; and
   providing a lock token related to the created lock to the requesting client computer system.

4. A method as defined in claim 3 wherein the act of locking the requested resources comprises creating a lock object for the requested resources.

5. A method as defined in claim 3 wherein the act of locking the requested resources comprises updating an existing lock object to lock the requested resources.

6. A method as defined in claim 3 wherein a predetermined number of resources may be locked on one lock object.

7. A method as defined in claim 3 wherein the request further comprises information related to the type of access desired and a resource list of resources to be locked, said method further comprising:
   determining whether other resources should be locked; and
   if other resources should be locked; adding those resources to the resource list and locking those resources.

8. A computer program product readable by a computer and encoding instructions for executing the method recited in claim 5.

9. A method as defined in claim 3 further comprising deadlock resolution acts in response to conflicting lock requests; said deadlock resolution acts comprising:
   receiving at least one other request to access more than one resource, wherein the other request originates from a second client computer system;
   determining that at least two requests for multiple resources include requests for the same resources such that simultaneous locking may result in deadlock; and
   satisfying at least one lock request to thereby prevent deadlock.

10. A method as defined in claim 4 further comprising:
    prior to the act of creating a lock, determining whether the resources are locked by one or more other client computer systems; and wherein
    the act of creating a lock only occurs if no existing lock conflicts with the type of access requested or the type of lock requested.

11. A method as defined in claim 5 further comprising:
    prior to the act of updating a lock, determining whether the resources are locked by one or more other client computer systems; and wherein
    the act of updating a lock only occurs if no existing lock conflicts with the type of access requested or the type of lock requested.

12. A method as defined in claim 9 wherein the act of satisfying at least one lock request further comprises the act of granting each resource lock portion prior to attempting any lock portion for the other lock request.

13. A method as defined in claim 11 wherein the method further comprises:
    determining whether other resources should be locked; and
    if other resources should be locked; locking those resources.

14. A method as defined in claim 13 wherein the method further comprises:
    prior to determining whether other resources should be locked, determining whether the client application program making the lock request is the owner of the existing lock; and
    denying any update to the existing lock if the client application is not the owner.

* * * * *